United States Patent
Kearfott

[15] 3,680,373
[45] Aug. 1, 1972

[54] GEAR TESTING DEVICE

[72] Inventor: Arman L. Kearfott, Livonia, Mich.

[73] Assignee: General Motors Corporation, Detroit, Mich.

[22] Filed: Nov. 16, 1970

[21] Appl. No.: 89,827

[52] U.S. Cl. ................................................73/162
[51] Int. Cl. ..............................................G01m 13/02
[58] Field of Search..........................................73/162

[56] References Cited

UNITED STATES PATENTS 3,078,711   2/1963   Shutt ..............................73/162

Primary Examiner—Louis R. Prince
Assistant Examiner—Denis E. Corr
Attorney—W. E. Finken, A. M. Heither and Charles R. White

[57] ABSTRACT

Gear testing device in which planetary test unit has a sun, a ring and two independent planet gears. Separate carriers are provided for the planet gears with a first carrier connected to ground and the other carrier loaded torsionally so that the gearing of the planetary unit is loaded. Torsional driving forces for the device are only those necessary to overcome the frictional forces of the planetary unit which are substantially lower than the gear tooth loading forces generated during the test.

4 Claims, 3 Drawing Figures

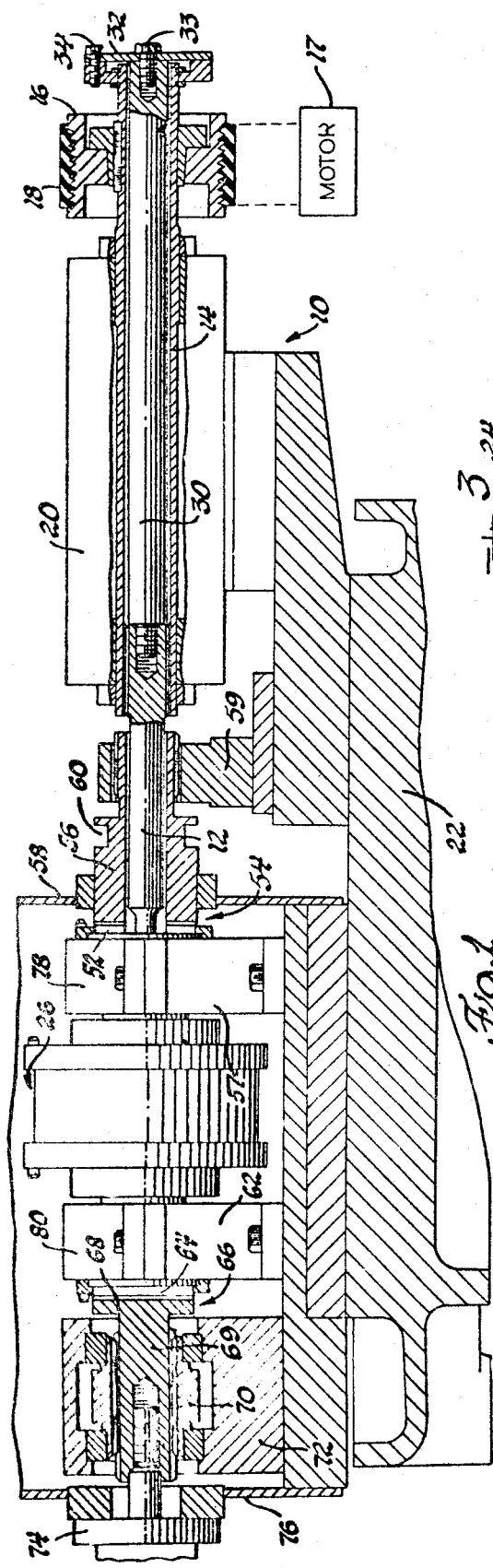

GEAR TESTING DEVICE

This invention relates to gear testing devices and more particularly to a planetary type gear testing unit having carrier construction connected to ground and to a test load to load the gearing of the unit to condition the unit for a gear fatigue test operation.

Before employing a newly designed gear unit in a transmission for field testing, the gear designer generally proves the design by the laboratory testing of the gears using special gear testing machines. Such laboratory machines most desirably apply large tooth loads to the unit and drive the unit with a small motor. Thus, in the well-known "four square" type gear testing machine the only operating power required in testing a pair of spur gears is that required to overcome the friction losses in the meshing gears and in the bearings. While such machines are entirely satisfactory for many designs, they do not make full provision for testing of planetary gear systems.

This invention provides for such testing with a new and improved planetary type arrangement set up to produce a highly realistic test of the components of the gear unit. In this testing fixture separate planet gears have independent carriers connected respectively to a predetermined torsion load and to ground to provide a load on the meshing gear teeth. In this system a central gear provided by either the ring gear or sun gear can be utilized as an input with the gear not used as an input freewheeling as a loaded member.

It is a feature and object of this invention to provide a new and improved gear testing unit for testing a planetary gearset in which the minimum power required to operate the machine is only that required to overcome friction losses in the gearing and in the bearings.

Another feature and object of this invention is to provide a new and improved gear testing machine for planetary gear units in which opposing planet gears are connected by independent carriers to ground and to a predetermined torsional load with either the sun or ring gear employed as an input and with the other gear freewheeling during testing operation as a loaded gear member.

It is another feature and object of this invention to provide a new and improved planetary gear testing machine which has a small input motor and which has large tooth loads applied to the gears being tested.

In this planetary test fixture, two planet gears are preferably employed diametrically opposite to each other; one of the planet gears is connected by its carrier to ground while the other is connected by its carrier to a predetermined torsional load to provide for equal and opposite loading of both planet gears. Preferably the sun gear is driven as an input with the ring gear allowed to freewheel as an internally loaded member. Both spur and helical type gears can be tested on this machine with good results.

These and other objects, features and advantages of this invention will become more apparent from the following detailed description and drawing in which:

FIG. 1 is a side sectional view partly in section of a gear fatigue test assembly.

FIG. 2 is a side sectional view of a planetary gear unit test fixture utilized in FIG. 1.

FIG. 3 is a sectional view taken along lines 3—3 of FIG. 2 with a schematic addition showing the carriers of the planetary gears of the gear unit.

In FIG. 1 there is shown a gear testing assembly 10 having an input quill 12 which is driven by a sleeve shaft 14. The sleeve shaft 14 is splined to an input sheave 16 which is driven by a suitable motor 17 through drive belt 18. The sleeve shaft 14 is rotatably mounted in a pillow block 20 which is rigidly fixed to a stationary base 22.

As shown best by FIG. 2 one end of the input quill 12 extends into rotatable housing 24 of a test gear fixture 26 and is splined at 27 into a sun gear 28. The other end of quill 12 is secured to an extension 30 that extends axially through sleeve shaft 14. An outer connecting plate 32 used to withdraw quill 12 from the sun gear, is bolted to the end of extension 30 by bolt 33 and to the sleeve shaft 14 by bolt 34.

The sun gear meshes with diametrically opposing planet gears 35 and 36 which in turn mesh with a ring gear 38 that is connected by radially extending dowels 40 to the rotatable housing 24. The housing 24 is mounted by anti-friction bearings 42 on oppositely-extending and independent carriers 46 and 48 of planet gears 35 and 36 respectively. Carrier 46 has an axially extending sleeve portion that is rotatably mounted in an upright 57 secured to base 22 and is splined at 50 to an input portion 52 of a brake 54. An annular cap 55 is removably secured to the side of upright 57 to retain this portion 52 of this brake in the operating position shown. The brake has an output portion 56 which is splined for axial sliding movement by an end plate 58 and by a support 59 secured to the base 22. The output portion of the brake has a collar formed by an annular groove 60 which receives a suitable operator mechanism that can axially slide the brake portion 56 to and from contact with the brake portion 52 so that planet gear 35 may selectively be held or released.

The carrier 48 of the planetary gear 36 is supported in an upright 62 and is splined to an input portion 64 of a selectively engageable load clutch 66. A retainer cap 67 is removably secured to the side face of upright 62 to maintain this clutch part in position. This load clutch has an output portion 68 with an axially extending shaft 69 that is splined to a torque arm 70 mounted for limited rotation by suitable bearings in a support 72 fixed to base 22. A motor such as a hydraulically actuated piston device 74 supported by a plate 76 extending upwardly from the base 22 is employed to affect the selected engagement and disengagement of the load clutch 66 by the appropriate axial movement of the clutch portion 68 splined in the torque arm 70.

Upper cap members 78 and 80 are secured by suitable bolts to the uprights 57 and 62 respectively to hold the test fixture 26 in position during testing. Lubricants to the bearings are supplied through passages 82 and 84 provided in uprights 57 and 62 respectively.

FIG. 3 diagrammatically illustrates the gear test fixture 26 set up to provide testing of all of the elements which make up the planetary gear train. There is a test load 86 connected to torque arm 70 which is preselected to apply a predetermined load to the planetary elements. For example the test load could be a counterclockwise force on the carrier 48 and connected planet gear 36. This force is balanced by the reaction force of the grounded carrier 46 and the connected planetary gear 35. Under such conditions the meshing teeth of the sun planet and ring gears are torsionally loaded and ready for fatigue testing. With the gears of the planetary unit loaded, the motor 17 need develop only power sufficient to overcome the friction losses in the gear test assembly which are primarily those of the planetary unit being tested.

For the test, a predetermined torsional load is connected to the torque arm 70 and brake 54 and clutch 66 are applied. The motor 17 is started to drive the sun gear 28. The planet gears loaded by the torsion load are rotatably driven in position by the sun gear; the ring gear is in turn driven as an internally loaded part by the planet gears with the housing 24 connected to the rotating ring gear.

When the test time expires, motor 17 may be shut down and the brake 54 and clutch 66 disengaged. The quill 12 is then removed from the sun gear by using plate 32 as a handle and withdrawing the quill axially. The retainer cap members 78 and 80 are removed from the uprights 57 and 62 respectively and the test unit is removed as a body from the assembly so that it may be easily torn down for detailed inspection of the gearing components.

With this invention a series of planetary transmissions can be simultaneously tested. This is readily accomplished by drivingly connecting the carrier 48 to the input gear of a second planetary unit instead of to the test load. The carrier of that unit, equivalent to carrier 48, is then connected to the test load to effect the loading of the gear teeth of the two units upon grounding of carrier 46 and its equivalent in the second unit. Additional planetary units may be added in the same fashion if desired. Also planetary units employing helical gearing can be tested with good results with axial thrust forces generated during the test being cancelled out.

While a preferred embodiment of this invention has been shown and described, other embodiments will be now readily apparent to those skilled in the art. This invention is thus to be limited only by the claims and not by the particular drawing and description disclosing the preferred embodiment of the invention.

What is claimed is:

1. In a gear fatigue test assembly, a gear test fixture comprising a planetary gear unit; said gear unit having a sun gear and a ring gear drivingly connected by at least first and second planet gears, a separate carrier for each of said planet gears, a torsion load operatively connected to a first of said carriers; reaction means for retarding movement of said second of said carriers so that a load is produced upon the meshing teeth of the gears of said gear unit to thereby condition said unit for a testing operation while under load, and motor means for driving one of said first mentioned gears so that said planet gears can drive the other of said first mentioned gears in a gear testing operation.

2. In a gear testing device, a planetary gear unit having central input gear means, a plurality of separate planet gear means meshing with said central gear means, driven gear means meshing with and driven by said planet gear means, a separate carrier for each of said planet gear means, torque transmitting means operatively connected to one of said carriers to retard the rotation thereof, load means operatively connected to the other of said carriers for applying a torsional load thereto so the meshing teeth of the gears of said planetary unit are loaded to thereby condition said unit for gear fatigue testing by the drive of said input gear means.

3. In a gear testing assembly, a planetary gear test unit having an input gear and a plurality of planet gears meshing with said input gears and having a driven gear meshing with said planet gears, a separate carrier for each of said planet gears, a test load, clutch means operatively connected to said test load and a first of said carriers, means for selectively engaging said clutch for connecting said first carrier to said test load, braking means selectively engageable for connecting a second of said carriers to ground so that a predetermined torsional load is impressed upon the meshing teeth of the gears of said planetary unit to thereby condition the planetary gear unit for gear fatigue testing by the drive of said input gear.

4. In a gear fatigue test assembly, a gear test fixture comprising a planetary gear unit having a sun gear and a ring gear drivingly connected by opposing first and second planet gears, a separate carrier for each of said planet gears, one of said carriers extending in a first axial direction, another of said carriers extending in an opposite axial direction, selectively engageable brake means operatively connected to said first carrier for retarding rotation thereof when engaged, a test load, selectively engageable clutch means operatively connected to said test load and to another of said carriers and engageable to operatively connect said last-mentioned carrier to said test load so that the meshing teeth of said planetary unit are loaded, and motor means drivingly connected to one of said first mentioned gears for effecting rotation of all of said gears of said planetary gear unit while loaded by said test load in a gear fatigue testing procedure.

* * * * *